UNITED STATES PATENT OFFICE.

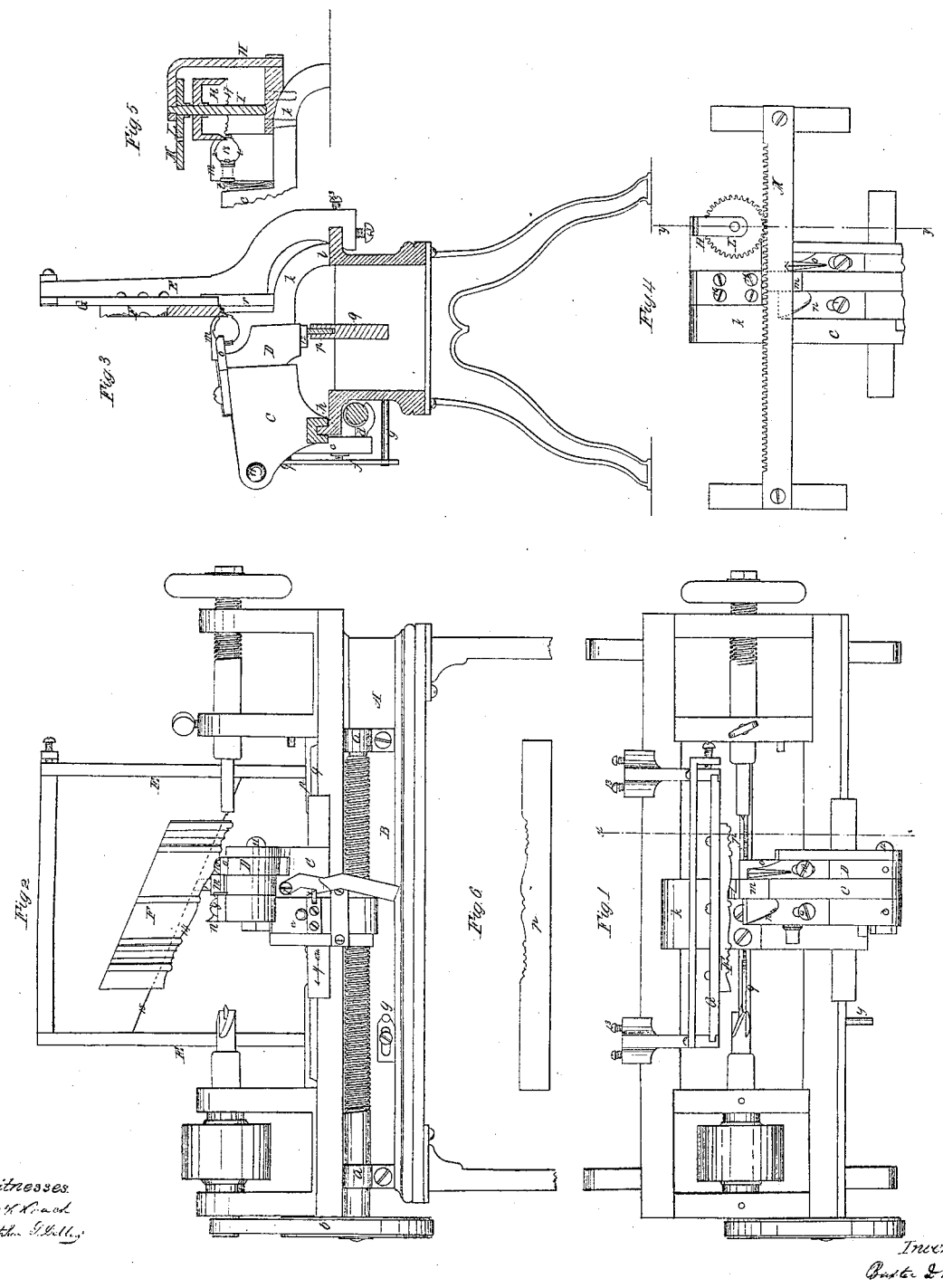

BAXTER D. WHITNEY, OF WINCHENDON, MASSACHUSETTS.

LATHE.

Specification of Letters Patent No. 29,534, dated August 7, 1860.

*To all whom it may concern:*

Be it known that I, BAXTER D. WHITNEY, of Winchendon, in the county of Worcester and State of Massachusetts, have invented certain Improvements in Automatic Turning-Lathes, of which the following is a full, clear, and exact description, reference being had to the accompanying drawings, making part of this specification, in which—

Figure 1, is a plan of a lathe with my improvements attached; Fig. 2, an elevation of the same; Fig. 3, a transverse vertical section on the line $x$, $x$, of Fig. 1; Fig. 4, a plan of a modification of my invention; Fig. 5, a vertical section upon the line $y$, $y$, of Fig. 4; Fig. 6, detail to be referred to hereafter.

My invention has particular reference to that class of lathes in which the article to be turned is passed through an annular or ring rest, by which it is supported and steadied in the immediate vicinity of the point where the cutting tools act upon it, and my invention consists in the combination, of a finishing or smoothing tool, with such a lathe, the cutting edge of the finishing tool having a contour exactly corresponding to that of the finished article, and being so arranged that its successive portions shall be brought to bear upon corresponding portions of the article in the immediate vicinity of the annular rest by which it is encircled and supported.

My invention also consists in an improved annular rest for sustaining and steadying the article being turned which will be more particularly described hereafter.

That others skilled in the art may understand my invention I will proceed to describe the manner in which I have carried it out.

In the said drawings A, is the lathe, having heads and centers of the ordinary construction. A screw B, supported on the front of the lathe in bearings $a$, is driven by a belt $b$, from the lathe spindle and serves to give motion to the slide rest C, which is traversed in the direction of the arrow $y$, when the lathe is in operation in the following manner. A slide $c$, fitted into the front of the rest, carries at its lower extremity a half-nut $d$ (Fig. 3), which engages with the screw B, being held up in contact therewith by the latch $f$ which is pivoted at 7, to the front of the rest C, and catches under a stop 8, projecting from the face of the slide. As the slide rest C, reaches the end of its traverse the latch $f$, strikes against an adjustable stop $g$, on the front of the lathe, by which it is tripped and the slide $c$, and half-nut $d$, drops. The slide rest is thus arrested, and is returned by hand to the opposite end of the lathe preparatory to commencing the operation anew. The slide rest C, traverses on a suitable way $h$, at the front of the lathe and has an arm $k$, which extends over and rests upon a way $l$, at the back of the lathe (Fig. 3). This slide rest carries, first, the gouge cutter $n$, which turns the stick down to a uniform size so that it may fit snugly in the annular rest, the cutter being secured to the slide by a screw and slot (9); second, the annular rest $m$, through which the stick passes after having been dressed by the gouge cutter $n$, and by which it is steadied and prevented from bending and trembling while under the action of the cutter; third, the V-shaped cutter or forming tool $o$, which is attached by a screw and slot at 10 to a block D. This block is pivoted at 11 to the slide rest C, and rests at one end (12 Fig. 3) upon the pattern $p$, (shown in elevation in Fig. 6), which is made to accord to the contour to be given to the article and is secured to the top of a rail $q$, running longitudinally through the lathe. As the slide rest traverses in the direction of the arrow $y$, (Fig. 2), the pattern $p$, raises the forming cutter $o$, or permits it to descend so as to give the required molding to the stick.

Thus far the operation of this lathe is similar to that of others heretofore in use. The stick after being centered in the lathe is turned down by the cutter $n$, to a size that enables it to pass through the annular rest $m$; as the slide rest C', advances in the direction of its arrow $y$, the "V-shaped" cutter $o$, (to which the required motions to and from the stick are imparted by the pattern $p$,) turns the stick to the required contour, but it necessarily leaves the surface rough, and the finer moldings and the bottoms of the smaller grooves are imperfectly cut. To finish up these smaller grooves and to leave the entire work smooth and fit for use without the necessity of submitting it to a further operation is the object of the first part of my invention, which I will now proceed to describe.

E is a gallows frame which is secured by screws 13, to the back of the lathe. In suitable ways in the upright portion of this frame slides a gate G', the lower edge 15, of which is inclined as seen in Fig. 2. To the face of the gate G, is bolted a knife F, the cutting edge 14 of which is of a form corresponding to the contour of the stick as made by the pattern $p$ and cutter $o$. The lower or inclined edge 15, of the gate rests upon a post or stud $r$, rising from the portion $k$, of the slide rest C', so that as the latter is moved along in the direction of the arrow $y$, (Fig. 2,) the gate G', is gradually lowered and the successive portions of the knife F are brought to operate upon the corresponding portions of the stick immediately behind the annular rest $m$, its edge finishing the stick as fast as it is brought into form by the V-shaped cutter $o$. The immediate vicinity of the annular rest preventing the stick from bending and vibrating, during the operation.

The finishing knife F, represented in the accompanying drawings has an irregular cutting edge suited to the turning of chair legs, but it may be formed to suit any pattern of stick that can be turned in a lathe. It is made by giving to its front surface a contour corresponding to that of the article to be turned as seen in plan in Fig. 1, and in elevation in Fig. 2. The lower edge is then grooved with a bevel upon its back side, as seen at 20 in Fig. 3, and a cutting edge is produced corresponding with the pattern (Fig. 6) and with the contour to be given to the stick. If the article to be turned be a cylinder the edge of the finishing knife will be straight, but it must in all cases be brought to bear upon the different portions of the stick at a point immediately adjacent to the annular support or rest. There are other methods by which the different portions of a smoothing knife, the cutting edge of which corresponds to the contour of the article being turned, may be brought successively in contact with the corresponding portions of the article in the immediate vicinity of the annular rest, without departing from the spirit of my invention, although the plan above described is that which I prefer.

In Figs. 4 and 5, the frame E, and its sliding knife F are replaced by a frame H, which is shown in red, and is attached by screws 16 to the portion $k$, of the slide rest C'. This frame carries a vertical shaft I, on which is secured a circular or cylindrical cutter K, the cutting edge 17 of which has a contour corresponding to the form of the stick to be smoothed. This cutter is revolved in contact with the article, close behind the annular rest $m$, and so as to bring its different portions successively in contact with the corresponding portions of the article, in the following manner. The shaft I, has attached to it at its upper end a pinion L of the same diameter as the cutter K. This pinion engages with a rack M, rigidly secured to the heads of the lathe or to suitable standards rising therefrom. As the slide rest thus arranged is moved along in the manner before described, the pinion L is revolved by the rack M, and the circular cutter K is rolled slowly along, the different parts of its cutting edge coming in contact with the different portions of the article which is thus smoothed and finished as before.

The annular rest $m$, through which the stick passes after being turned down to the required size by the chisel $n$, has heretofore been made with a circular hole, but it is difficult to turn the stick so exactly to the size of the ring that it shall be held firmly and without too great friction. To remove this inconvenience I have cut away the interior of the annular rest so as to leave but three bearing points, one of which has a spring placed behind it to allow it to yield, and thus avoid the friction which would otherwise result from irregularities of surface or uneven spots left by the cutter $n$. In Fig. 5 is represented a rest constructed as above. The interior of the ring being cut away, as at 1, 2, and 3, and the block S, which forms one of the bearings being held up to its work by a spring $t$ placed behind it. The face of the block S is curved to coincide with the circle formed by the other bearing surfaces of the hole 18. A rest thus constructed with three bearing points one of which is allowed to yield, and to preserve a uniform pressure upon the stick, will hold the stick firmly and steadily and without undue friction even though it vary slightly in size, which would not be the case were the bearing circular and continuous.

I do not claim a finishing knife having the contour of the article to be turned when it is made to operate upon the stick simultaneously along its whole length, or when not employed in connection with a supporting rest in the immediate vicinity of which the different portions of the knife are caused to operate successively upon corresponding portions of the stick, but

What I claim as my invention, and desire to secure by Letters Patent is—

1. A finishing tool (F,) in combination with a forming cutter ($o$,) and a sliding rest ($m$,) so arranged that the different portions of the finishing tool shall be brought to bear successively upon corresponding portions of the article being turned immediately adjacent to the sliding rest as set forth.

2. The spring bearing $s$, within the annular rest $m$, operating as described for the purpose specified.

BAXTER D. WHITNEY.

Witnesses:
 THOS. R. ROACH,
 P. E. TESCHEMACHER.